F. S. SHIRLEY.
Manufacture of Glass from Lava.
No. 204,384. Patented May 28, 1878.
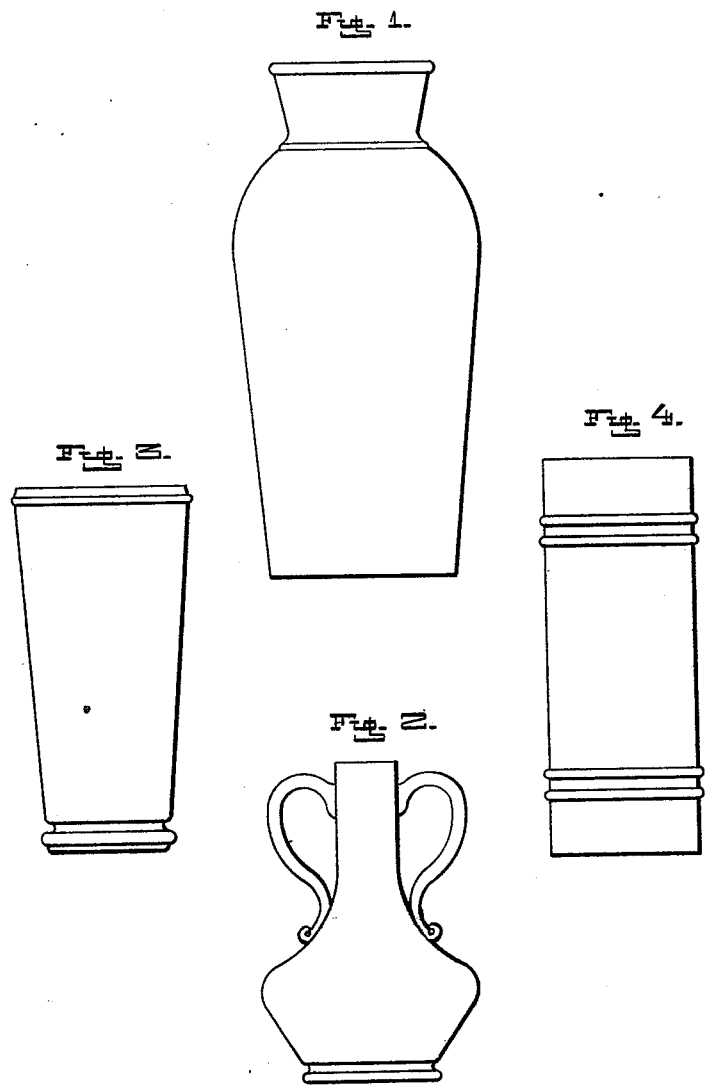

UNITED STATES PATENT OFFICE.

FREDERICK S. SHIRLEY, OF NEW BEDFORD, MASSACHUSETTS.

IMPROVEMENT IN MANUFACTURE OF GLASS FROM LAVA.

Specification forming part of Letters Patent No. 204,384, dated May 28, 1878; application filed April 6, 1878.

*To all whom it may concern:*

Be it known that I, FREDERICK S. SHIRLEY, of New Bedford, in the county of Bristol and State of Massachusetts, have invented certain new and useful Improvements in the Manufacture of Glass; and I do hereby declare the following to be a full, clear, and exact description of the invention, such as will enable others skilled in the art to which it pertains to make and use it, reference being had to the accompanying drawings, which form part of this specification.

My invention relates to an improvement in the manufacture of glass; and it consists in adding to flint-glass, as a flux, lava or volcanic slag in suitable proportions, so as to produce a glass which is capable of being blown, and which, when robbed of its glaze by the bath or other suitable treatment, will present a dull lusterless appearance, so as to adapt it especially for the imitation of antique ceramics, mosaic, and lava pottery-ware, and cheap reproductions of the works of ancient masters, as will be more fully described hereafter.

The accompanying drawings represent different forms of ware.

In the manufacture of my glass, I take seven parts of clear flint batch, and add thereto one part carbonate of potash or its equivalent and two parts of lava or volcanic slag. This slag, being mixed with vitreous impurities, mixes with and colors the mass so as to produce various tints and colors, which may be varied according as the proportions of the above ingredients are changed. When the melted mass is in proper condition for working, it is blown or otherwise molded into any shape that may be preferred, but is especially adapted for making copies of antique vases and urns and copies of works of art.

If desired, regular glass, except clear flint and plain white or opal glass, which decolorizes the coloring mixture, may be used and colored with the necessary chemicals to produce the required and varied colors, and to render the same opaque either by coating or backing with such dense coloring matter as vitrified cobalt, taffee, calcined vitriol, or their requisite equivalents for the several colors required. These substances are used as a substitute for the lava.

As the various articles produced will have a glaze and newness of appearance that unfit them to represent ancient works of art, they are subjected to the action of a suitable bath or any other process known to the art, whereby the glazing is entirely removed, and only a dull lusterless appearance is left. Should it be desired to have the glaze remain upon certain parts, these parts may be protected from the action of the bath in any suitable manner, or these parts may be afterward reglazed by any suitable compound. Upon these parts may be engraved any suitable figure or design, or be fixed upon the parts in colors and fused to the surface. Gold and gilt decorations of all kinds can also be applied, and gold can be placed in the indented lines so as to produce a very handsome effect.

By thus mixing lava and glass, I produce a new compound which is capable of being blown as readily as glass itself, so that any form that is capable of being formed in that manner can be reproduced very rapidly. Instead of carbonate of potash, any other flux may be used, or a flux may be entirely done away with, if so preferred.

Having thus described my invention, I claim—

1. A compound that is capable of being blown, consisting of glass and lava, substantially as described.

2. As a new article of manufacture, an article of glassware made of lava and glass, substantially as specified.

In testimony that I claim the foregoing I have hereunto set my hand this 4th day of April, 1878.

FRED. S. SHIRLEY.

Witnesses:
R. M. BARR,
F. A. LEHMANN.